Patented Feb. 14, 1933

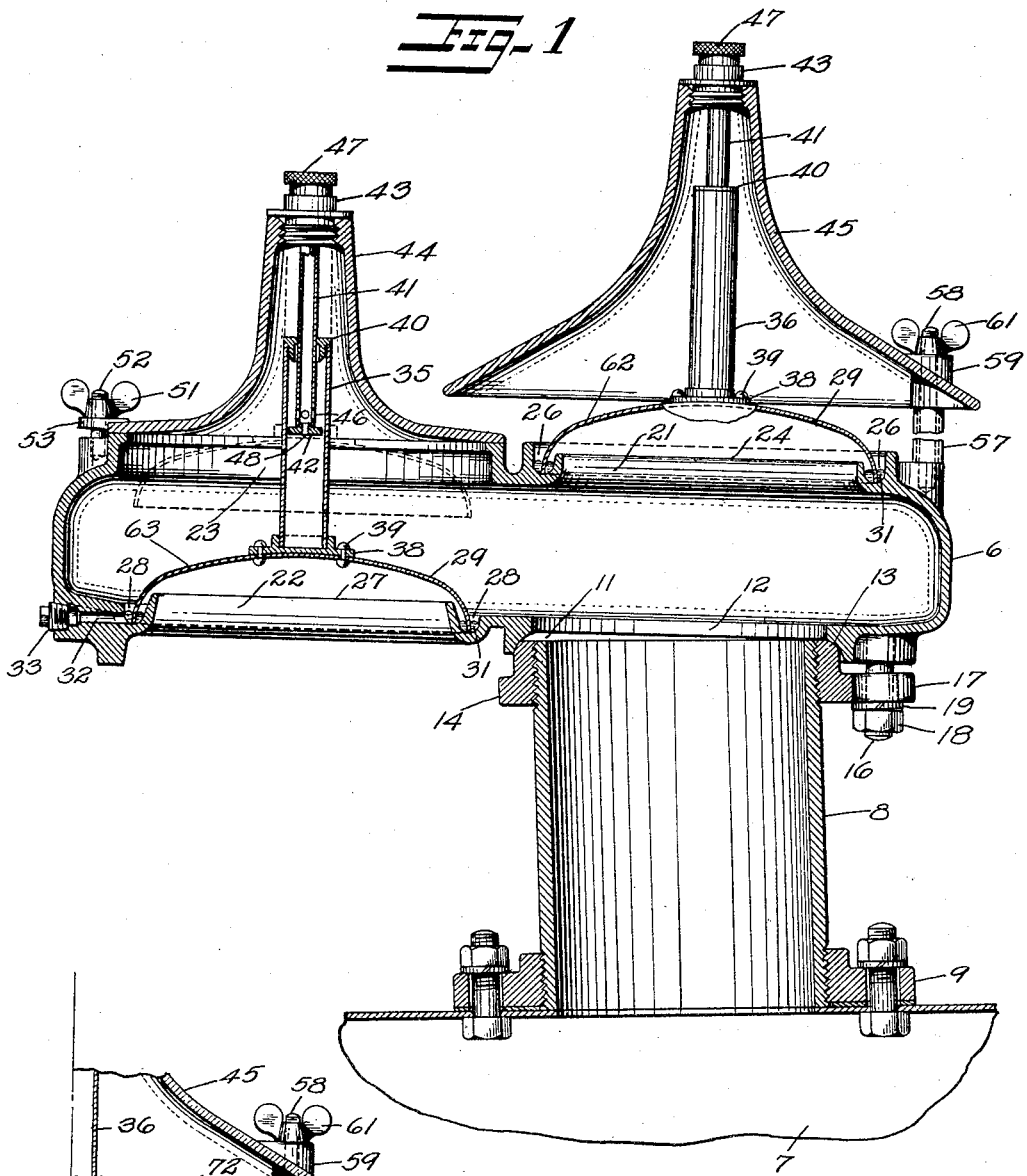

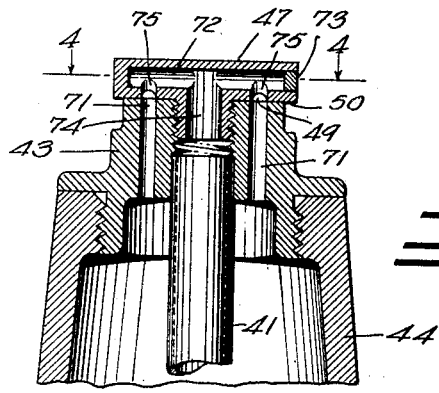
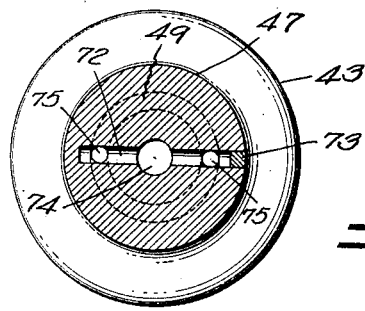
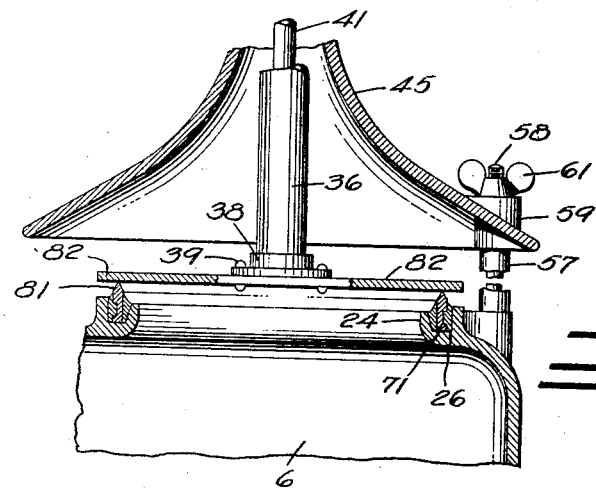

1,897,076

UNITED STATES PATENT OFFICE

REGINALD C. SHAND, OF BERKELEY, CALIFORNIA

VALVE

Application filed December 17, 1929. Serial No. 414,663.

My invention relates to a valve, particularly to that type of valve which is employed in connection with containers utilized for handling or storing liquids such as petroleum and usually termed a breather valve.

It has been observed that material economies can be effected by prohibiting free air circulation to and from a tank containing a volatile liquid, where the volatile portion of the liquid is of value. This has been accomplished by providing a valve upon the otherwise vapor tight liquid container or tank which will not open until a pressure differential exists between the container and the atmosphere in excess of that for which the valve is set. By providing such a valve, vapor circulation is normally inhibited, only occurring when relatively extreme conditions exist. However, at times the rate of flow of vapor to or from the container may be at a relatively high rate and, when some other conditions arise, such as pumping into or out of the tank at a relatively high rate, the flow of vapor may exceed the maximum capacity of the valve to such an extent that a dangerous pressure differential is created. This may result in damage to the tank structure by collapsing or bursting it. At other times the pressure differential may closely approximate that for which the valve is set. With this condition the valve may not open positively, fluttering on its seat and thus giving rise to "hammering". Since this sets up abnormal stresses it is unwelcome and dangerous. While various means have been suggested for obviating these, none of them have been thoroughly satisfactory, interfering and reducing fluid flow and being uncertain in operation.

The valves heretofore have usually been positioned in communication with the tank by screwing them onto a nipple secured to a flange bolted to the tank. When the valve utilized a liquid for sealing purposes it was necessary to have the valve level. Since the tank roof slopes vary considerably in degree, it was usual to fit the flange on the roof so that the valve, when installed, was level. This required the fitting of the flange to accommodate for the roof slope, an expensive and uncertain procedure.

It is the broad object of my invention to provide a valve which overcomes certain of the above difficulties inherent in valves heretofore.

It is another object of my invention to provide a valve structure whose position can be adjusted after it is operatively placed.

Other objects of my invention will appear in the following specification in which I have outlined the preferred form of my invention. It is to be understood that the invention, as defined by the claims, is to be accorded a range of equivalents consistent with the state of the prior art.

In the drawings:—

Figure 1 is a cross section through a form of valve embodying my invention.

Figure 2 is a modified form of valve and valve seat.

Figure 3 is a side elevational view, partly in section, illustrating certain features of construction.

Figure 4 is a section on the line 4—4 of Figure 3.

Figure 5 is illustrative of another form of valve and valve seat which is particularly successfully employed under certain conditions.

Briefly characterized my invention comprises a valve in which the aperture provided for fluid flow is substantially unobstructed so that free flow may take place therethrough. Further, it includes the utilization of suitable valve damping means which are so provided as to obviate fluttering of the valve while not interfering with the flow of fluid and which are practically constant in operation. The valve is also adapted to be adjusted after it has been positioned in place so that it may be in a predetermined position, usually level, as compared to the tank.

In that form of valve which I have here chosen for illustration, a valve body 6 is positioned in communication with a fluid container such as tank 7 having a sloping roof as shown in Figure 1. This is effected, in accordance with my invention, through the employment of a nipple 8 threaded into a companion flange 9 which is secured to the tank. The valve body is provided with a curved annulus 11 defining an aperture 12 and adapted to seat and be moved upon an edge 13 cooperatively provided on a valve base 14 which is threaded onto the nipple 8. The valve may be moved relative to the base to a desired position with respect to the tank and then secured. To secure the valve, a plurality of circumferentially spaced studs such as indicated at 16 are conveniently utilized. These extend from the body through bosses 17 provided on the base and are retained by nuts 18 and lock washers 19. This manner of providing the valve obviates the special fitting of the flange 9 to the slope of the roof.

The body 6 is usually cast of a suitable material to have, in addition to the previously mentioned aperture 13, other apertures respectively designated as 21, 22 and 23. The aperture designated as 21 is usually formed with an upturned lip 24 to provide an annular cavity 26. Aperture 22 is likewise provided with an upturned lip 27 to form annular cavity 28. These apertures, namely 21 and 22, are respectively provided for the efflux and inflow of vapor from and to the tank. The upturned lips 24 and 27, particularly lip 27, prevent condensate from passing out through the apertures which they form, tending to keep it within the valve and return it to the tank.

In accordance with my invention I provide valve means for controlling flow of vapor through the apertures 21 and 22 in such a manner that the apertures are substantially entirely free, thus permitting a greater quantity of vapor to pass through the apertures with a relatively low pressure drop. Movable valves 29, formed of a suitable material as aluminum, copper or Monel metal, depending upon the character of the service in which the valves are to be employed, are provided. The sealing of the valve is accomplished by filling the annular cavities 26 and 28 with a suitable sealing fluid 31 as mercury, oil or glycerine. A convenient manner of introducing the fluid is through a passage 32 leading to the annular cavity and closed by a screw plug 33.

To overcome the tendency for the valves to flutter or chatter on their seats, I provide suitable dampening means, preferably dash pots, indicated generally at 36. These are preferably positioned on the valve so that the apertures 21 and 22 through which vapor flow takes place are free of any obstructions and so that collection of condensate in the dash pots is minimized. Since the dash pot depends for its action in part upon a liquid, dilution of the liquid renders action of the dash pot less effective to prevent the fluttering. The dash pots are conveniently formed of a metal tube 35 joined by soldering to a flange 38 which is secured by rivets 39 to the valve. The tube 35 is closed by a frictionally engaged guide 40 apertured to pass a hollow small tube 41. Secured to the small tube and fitting freely within the tube is a piston 42, preferably of metal since wood is apt to swell and stick. I have observed that the dampening action is improved by forming fluid passages in the piston so that fluid access across the piston is possible. Such a passage is provided by passageway 48. With a suitable fluid as oil in the tube the loose fit of the piston prevents the valve from chattering on its seat while permitting it to move to allow vapor to pass through the aperture.

The valve is guided during its movement by engagement of the metal piston with the tube 35 and by engagement of the guide 40 and the small tube 41 which is securely held frictionally in a member 43. Member 43 is usually adapted to be screwed into a hood. Admission of fluid to the tube 35 is conveniently cared for by providing apertures 46 in the rod so that communication may be had with the tube. Upon removal of screw cap 47 from the member 43, the fluid can be introduced into the small tube 41 to flow through the apertures 46 into the tube. The proper oil level in the tube 35 is conveniently fixed by raising the valve to extreme open position and then, with the valve in this position, filling the tubes with oil.

Passage of vapor to and from the small tube 41 is cared for by forming cap 47 with a circular groove 49 upon its lower face 50. Member 43 is drilled to provide holes 71 extending longitudinally of it and positioned to coincide with the groove. Vapor passage from the small tube to the holes is cared for by drilling a passage 72 partially through the cap, the opening formed by the drilling being closed by plug 73. The passage 72 is in communication with the groove through short passages 75 and with a vapor passage 74 formed in the cap so that a passageway exists through vapor passage 74 from the small tube to groove 49 and to the holes 71 which extend to the interior of the hood.

The hoods 44 and 45 serve as a supporting means for the small tube 41 utilized in connection with the dash pots and also to cover over the valve structure. The hood indicated at 44 is adapted to be secured over the aperture 23 to be vapor tight. This is conveniently accomplished by wing nuts 51 engaged with circumferentially spaced studs 52 which project from the valve body and pass through ears 53 on the hood.

Hood 45 is adapted to be spaced from the body to provide for vapor efflux about it from aperture 21. This is conveniently cared for by positioning spacers 57 on circumferentially spaced studs 58 which extend through bosses 59 in the hood. Wing nuts 61 are engaged with the studs 57 to secure the hood in spaced position.

Upon occurrence of a pressure differential across the valve body which is greater than that for which the valve is set, vapor flow will take place to or from the tank, depending upon the exact nature of the differential. Thus, when the pressure within the tank is greater than that about the valve body, pressure valve 62 will lift to permit flow of vapor through the aperture 21 outwardly about the hood 45. It is to be noted that the aperture is entirely free and that vapor flow is not obstructed while the dash pot is entirely out of the flow of vapor thus obviating any tendency for condensate to collect and flow into the dash pot to dilute the oil. Similarly, when a decrease in pressure occurs within the tank, and the pressure becomes less than that about the body, vacuum valve 63 will lift to a position as indicated in Figure 1 and permit flow of fluid from the atmosphere about the valve into the tank.

In that form of the invention illustrated in Figure 2 a valve seat 71 formed of an annular ring is shown as positioned in the annular cavity for cooperative seating engagement with a valve 72. This type of seat has certain advantages over liquid seals, particularly where the valves must be installed and left without maintenance or inspection for a considerable length of time. The valve seat may be constructed of suitable materials as metals, or suitable non-metals as resinous products and retained in place in the annular cavity by filling the cavity with a suitable agent as an alloy or by other means such as that cementing material known as "Smooth-On".

In the valve shown in Figure 5 a valve seat having a knife edge 81 is positioned for cooperative engagement with disc 82. This structure provides a valve of the poppet type which, in some instances, possesses distinct advantages over other types of valves. The materials here employed may be those best suited to the conditions.

In operation the valve may be initially constructed of a weight sufficient to provide the desired opening pressures. However, if variation in these pressures is to be made it is expedient to make them of a relatively light weight and then "load" them with suitable weights as lead washers.

By providing the constructions shown, material improvements have been effected over prior valves, the flow capacity being increased and condensation difficulties obviated or minimized substantially. With respect to flow capacity, the capacity of the valve here disclosed was 100,000 cubic feet per hour as compared to 55,000 cubic feet per hour for a prior valve having the same size aperture.

I claim:

1. In a breather valve adapted to be connected to a fluid containing tank, a body apertured to provide an inlet valve seat and an outlet valve seat, each surrounding passages for vapor passing to and from said tank, a movable inlet valve member for positioning on the inlet valve seat to seal off vapor passing to the tank, the body having an apertured portion immediately over the inlet valve seat through which the inlet valve member can be passed, a hood adapted to engage the body to seal the said apertured portion, a dash pot mechanism carried cooperatively by the hood and the valve and extending between them within the body so as to leave a free fluid path through the passage sealed by the valve member, another movable valve member for positioning on the outlet valve seat to seal off vapor passing from the tank, said valve members being respectively operable in response to a lower than atmospheric pressure and a higher than atmospheric pressure within the tank, a hood member secured over the other movable valve member in spaced relationship to the body to permit free fluid passage past the other valve member, and a dash pot mechanism extending between the other valve member and the hood member outside of the body so as to permit an entirely free fluid path through the passage sealed by the other valve member.

2. In a breather valve adapted to be connected to a fluid containing tank, a body aperture to provide an inlet valve seat and an outlet valve seat, each surrounding passages for vapor passing to and from said tank, a movable inlet valve member for positioning on the inlet valve seat to seal off vapor passing to the tank, the body having an apertured portion immediately over the inlet valve seat through which the inlet valve member can be passed, a removable hood adapted to engage the body to seal the said apertured portion, a dash pot mechanism carried cooperatively by the hood and the valve and extending between them within the body so as to leave a free fluid path through the passage sealed by the valve member, the dash pot mechanism and valve member being removable with the hood, another movable valve member for positioning on the outlet valve seat to seal off vapor passing from the tank, said valve members being respectively operable in response to a lower than atmospheric pressure and a higher than atmospheric pressure within the tank, a hood member movably secured over the other movable valve member in spaced relationship to the body to permit free fluid passage past the other valve member, and a dash pot mechanism extending between the other valve member and the hood member outside of the body so as to permit an entirely free fluid path through the passage sealed by the other valve member, the dash pot mechanism and the other valve member being removable with the hood.

3. In a breather valve adapted to be connected to a fluid containing tank, a body apertured to provide an inlet and an outlet passage to the tank, the body including grooved portions surrounding the inlet and outlet portion and adapted to contain a liquid sealing fluid, valve members cooperatively positioned with respect to each groove and adapted to cooperate with the liquid sealing fluid to seal off vapor flow through both the inlet and outlet passages, the body including an aperture providing a passage for fluid communication with the tank, a flange for engagement with the body, the flange and body having surfaces permitting a limited universal movement between them so as to permit the valve to be installed and maintained in a position on a tank roof wherein the liquid sealing fluid is uniformly distributed in the grooved portions, and means for securing the flange and body together.

4. In a breather valve adapted to be connected to a fluid containing tank, a body apertured to provide an inlet and an outlet passage to the tank, the body including grooved portions surrounding the inlet and outlet portion and adapted to contain a liquid sealing fluid, valve members cooperatively positioned with respect to each groove and adapted to cooperate with the liquid sealing fluid to seal off vapor flow through both the inlet and outlet passages, the body including an aperture providing a passage for fluid communication with the tank, a flange having a curved extension thereon, the body being recessed adjacent the last mentioned aperture to receive the said curved extension to allow for a limited universal movement between them so as to permit the valve to be installed and maintained in a position on a tank roof wherein the liquid sealing fluid is uniformly distributed in the grooved portions, and means for securing the flange and body together.

5. In a breather valve including an aperture adapted to be covered by a valve member, a liquid seal for providing a seating and vapor sealing closure about the aperture for the valve member, a body carrying the valve member and the liquid seal in cooperative relationship, means for securing the body in communication with a liquid containing tank so that the valve member controls vapor flow through the aperture from and to the tank, the securing means including a joint adapted to permit leveling of the valve on the tank so that the liquid seal is maintained in full seating and vapor sealing closure position.

6. In a breather valve including an aperture adapted to be covered by a valve member, a liquid seal for providing a seating and vapor sealing closure about the aperture for the valve member, a body carrying the valve member and the liquid seal in cooperative relationship, means for securing the body in communication with a liquid containing tank so that the valve member controls vapor flow through the aperture from and to the tank, the securing means including a recessed flange on the valve and a body adapted to be inserted into the recessed flange to permit leveling of the valve on the tank so that the liquid seal is maintained in full seating and vapor sealing closure position.

7. In a device of the character described, a body having a passage therethrough for flow of fluid and having a valve seat formed within the same, a movable valve member cooperatively positioned upon said seat, an upright cylinder member having its lower end connected to said valve member, a piston slidably fitted within said cylinder member and adapted to form a dash pot therewith, a hood positioned above the valve member, the upper end of said cylinder member extending into said hood when said valve member is in closed position, and means forming a connection between the upper part of said hood and said piston.

8. In a device of the character described adapted to be mounted upon a fluid tank, a hollow body, a grooved valve seat formed within the body and adapted to receive a sealing liquid medium, a movable valve member adapted to cooperate with said seat, and means capable of universal adjustment for connecting the body to the tank, whereby the body can be adjusted to a position in which the liquid sealing medium is uniformly distributed within said groove.

9. In a device of the character described adapted to be mounted upon a fluid tank, a hollow body, a valve seat formed within the body, a fluid operated valve member adapted to cooperate with the seat, means secured to the body for guiding said valve member for linear movement towards and away from said seat, and means capable of universal adjustment for connecting the body to the tank, whereby the body can be adjusted to a position in which said guiding means will permit free movement of said valve member.

10. In a device of the character described adapted to be connected to a fluid tank, a hollow body, a valve seat surrounding an opening in said body, a movable valve member adapted to cooperate with said seat, a hood secured to said body above said seat, said hood having an upwardly extending portion above the center of the valve member, a dash pot mechanism interconnecting the upper end of said hood with said valve member, said mechanism extending upwardly into the interior of said upwardly extending hood portion.

In testimony whereof, I have hereunto set my hand.

REGINALD C. SHAND.